United States Patent [19]
Meier

[11] Patent Number: 4,467,883
[45] Date of Patent: Aug. 28, 1984

[54] WEIGHING APPARATUS INCLUDING PARALLEL GUIDANCE MEMBERS HAVING INTEGRAL GUIDE ARMS

[75] Inventor: Eugen Meier, Meilen, Switzerland

[73] Assignee: Mettler Instrumente AG, Greifensee, Switzerland

[21] Appl. No.: 411,994

[22] Filed: Aug. 27, 1982

[30] Foreign Application Priority Data

Dec. 22, 1981 [CH] Switzerland ........................ 8198/81

[51] Int. Cl.$^3$ ........................ G01G 3/14; G01G 3/00
[52] U.S. Cl. ........................ 177/210 FP; 177/225
[58] Field of Search ................ 177/210 FP, 211, 229, 177/255

[56] References Cited

U.S. PATENT DOCUMENTS

| | | | |
|---|---|---|---|
| 336,275 | 2/1886 | Wilson | 177/229 |
| 4,153,126 | 5/1979 | Knothe et al. | 177/229 |
| 4,383,586 | 5/1983 | Lee | 177/229 |

*Primary Examiner*—George H. Miller, Jr.
*Assistant Examiner*—Patrick W. Foster
*Attorney, Agent, or Firm*—Laubscher, Philpitt & Laubscher

[57] ABSTRACT

A weighing apparatus is disclosed in which the load carrier (3) is arranged immediately adjacent the console (1), whereby the length of the transmission arm (3*b*) between the load carrier and the measuring component is reduced to a minimum. The parallel guidance system for the vertically movable components is provided by upper and lower resilient guide members (11, 11') having parallel spaced first (11*a*) and second (11*bb*) guide arms connected at one end with the console and load carrier members, respectively, and freely suspended means (11*c*) connecting together the other ends of the arms, thereby to define a folded guide arrangement in which the temperature-dependent changes in lengths of the arms balance each other, whereby temperature-independent guidance is produced. Furthermore, by the use of a transmission member 3*b* of relatively short length, directional imbalances in the application of the weighing force upon the measurement system are avoided.

9 Claims, 5 Drawing Figures

WEIGHING APPARATUS INCLUDING PARALLEL GUIDANCE MEMBERS HAVING INTEGRAL GUIDE ARMS

BRIEF DESCRIPTION OF THE PRIOR ART

The present invention relates to weighing apparatus of the short travel type having a guidance system including a pair of parallel guide members for guiding a load carrier for vertical displacement relative to a console. Such weighing apparatus is disclosed, for example, in the Swiss Pat. Nos. 533,296, 552,799 and 591,685, and in the U.S. patents to Meier U.S. Pat. Nos. 3,779,072, 3,788,134, 3,897,681 and 3,963,082.

To be correct and to function accurately, certain measurement systems require that the force to be measured always be exerted in the same direction over the entire load area. This condition means, for example, in the case of weighing apparatus of the vibratory string type that the strings must be stressed only along their longitudinal direction, in other words, lateral force components must be avoided.

In known scales of this type, it has been possible to meet the requirement mentioned so far only at a comparatively great effort. Difficulties derive above all from the temperature-dependent changes in the properties of the guides for the parallel guidance of the load carrier, and in the transmission member between the load carrier and the measurement system. This problem until now has been solved by using materials with negligible temperature coefficients of, for example, the elasticity module for the critical parts or special means for temperature compensation.

The proposed solution according to the present invention resides in the fact that the load carrier is arranged in the immediate vicinity of the console and that each resilient guide member includes two arms each of which extends from the console and the load carrier in the same direction toward a common, freely suspended connecting point.

SUMMARY OF THE INVENTION

Accordingly, a primary object of the present invention is to provide an improved weighing apparatus wherein the load carrier is arranged immediately adjacent the console, the guidance members including at least one pair of parallel arms that are connected at one end with the load carrier and with the console, respectively, the other ends of the arms being connected by a freely suspended connection.

In this manner, the length changes of guide arms, which are subjected to the same temperature influence, balance each other out so that a temperature-independent parallel guidance of the load carrier is achieved, thereby affording the desired constancy of the distance between the load carrier and the console. By means of the arrangement of the load carrier in the immediate vicinity of the console, the transmission member furthermore can be kept so short that temperature changes will no longer exert any measurable influence at this point. If the arrangement furthermore is so made that the console is in the motion plane of the load carrier, for example, in a recess in the same, or vice versa, then the transmission member can even be dispensed with. In case of eccentric weighing material placement, the momentary rotation centers of the console and the suspension attachments in these cases are very close to the connecting points of the measurement member. Quite generally speaking, due to the proximity of console and suspension attachment, great stability can be effected with a minor material expenditure.

The resilient guide members are preferably made in one piece, for example, they are made as punched parts. A preferred version however consists in the fact that all the guide arms arranged in a plane are formed integrally in a common piece.

In order to isolate the console from the scale frame with respect to the vibrations, mechanical low-pass filters in the form of resilient arms are provided, thereby presenting the possibility of making the flexible springs, acting as low-pass filters, integral with the resilient guide members of the same plane, respectively.

In this case, there is needed—for the guides and the low-pass filters on both superposed planes—a total of only two identical elements, for example, elements made as punched parts, which furthermore can be made of a material that can be selected purely from the mechanical viewpoint. This affords a simple and low-cost design in terms of manufacture and assembly. The scale frame or the scale housing, respectively, does not require any special stability and therefore can be made of synthetic plastic materials, for example.

BRIEF DESCRIPTION OF THE DRAWING

Other objects and advantages of the present invention will become apparent from a study of the following specification, when viewed in the light of the accompanying drawing, in which.

DETAILED DESCRIPTION

Figure 1:
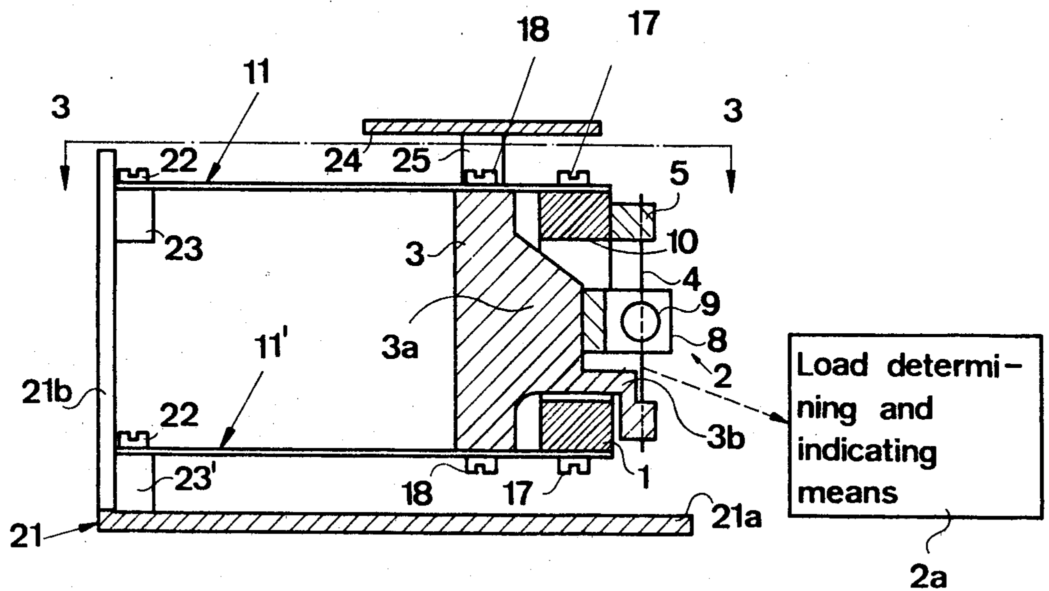
FIG. 1 is a sectional view taken along line 1—1 of FIG. 2.
Figure 2:
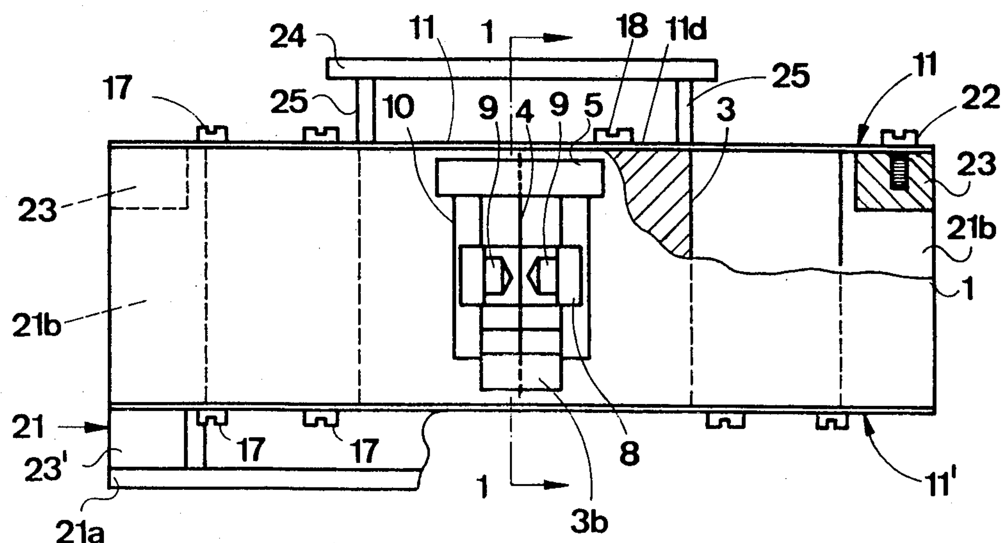
FIG. 2 is a right hand end view, with certain parts broken away, of the apparatus of FIG. 1.
Figure 3:
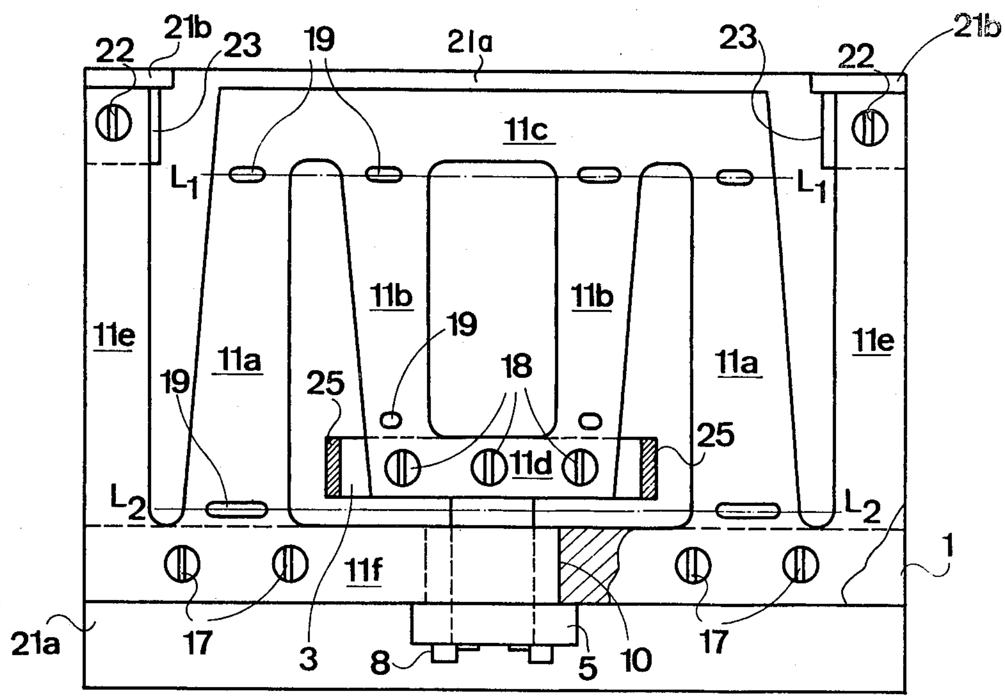
FIG. 3 is a sectional view, with certain parts broken away, taken along line 3—3 of FIG. 1.

Referring now to the patent drawing, the weighing apparatus of the embodiment shown is of the short-travel oscillatory string type including a console 1 which, in accordance with the present invention, is arranged adjacent the load carrier member 3 to define a load measuring system 2 including a vibratory string 4, as is known in the art. The load carrier member 3 includes a boss portion **3*a* that extends through an opening 10 contained in the console member 1, the string 4 being connected on the outside of the console between boss extension 3*b* and a horizontal support 5 that is secured to the console member 1 above the opening 10. Secured to the boss 3*a* is a U-shaped yoke 8 that carries a pair of permanent magnets 9 that define a magnetic field containing the measuring string 4**.

Figure 4:
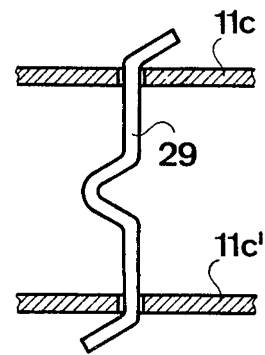
FIG. 4 is a detailed view illustrating the string or wire connecting means between the upper and lower resilient parallel guidance members and FIG. 5 is a plan view of the stamped resilient horizontal guidance member of FIG. 3.
Figure 5:
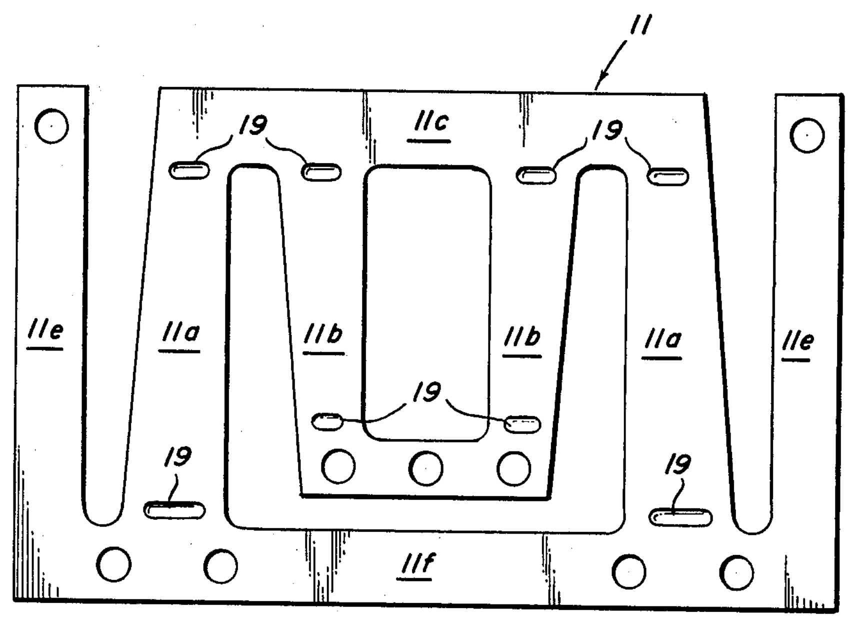

In accordance with the present invention, parallel resilient guidance means including upper and lower horizontal guidance members 11, 11′ are provided for guiding the load carrier member 3 for vertical movement relative to the stationary frame 21 of the weighing apparatus. The frame 21 includes a horizontal base portion **21*a*, and a pair of vertical columns 21*b* each of which carries spaced upper and lower supports 23, 23′. Each guide member is formed from a sheet of resilient material punched to define a first pair of spaced generally parallel longitudinally extending horizontal arm portions 11***a* connected at one end with the console member 1; and a second pair of spaced parallel arm portions 11*b* arranged between the first pair of arms, the second pair of arms being connected at one end with the load carrier member 3. First connecting portion 11*c* connects the free ends of the arms 11*a* and 11*b*, and a second connecting portion 11*d* connects the ends of the arms 11*b* that are connected with the load carrier member 3. A third pair of spaced parallel arms 11*e* is provided between which the other arms are arranged, the third pair of arms being connected at one end with the console 1, and at the other end with the supports 23 on vertical columns 21*b* of the frame. The ends of arms 11*a*, 11*b* and 11*e* adjacent the console 1 are connected by a third connecting portion 11*f* of the resilient guidance member. A plurality of screws 17 connect the third connecting portion 11*f* with the console 1, a plurality of screws 18 connect the second connecting portion 11*d* with the load carrier member 3, and screws 22 connect the ends of arms 11*e* with the supports 23 on the vertical columns 21*b* of stationary frame 1. It is important to note that the first connecting portions 11*c* are freely suspended relative to the frame 21. As shown in FIG. 4, a variable length connection, such as a wire 29, may be provided between the first connecting portions 11*c* and 11*c'* of the upper and lower guidance members 11 and 11'. The guide arms 11*a* and 11*b* may be provided at their ends with aligned recesses 19 that define lines of bending $L_1$, $L_2$ that extend transversely of the weighing apparatus.

As indicated above, the upper and lower resilient parallel guide members 11, 11' are punched from a sheet of resilient material, the resilient outermost pair of arms 11*e* constituting low-pass mechanical filters by means of which the console 1 is connected for vertical movement relative to the frame 21. The load receiving dish or tray 24 is supported in elevated relation above the load carrier 3 by a pair of laterally spaced vertical supports 25.

Basically it would also be possible to arrange consoles and load carriers within each other in such a manner that the contact points of guide arms 11*a* and 11*b* would lie along one line. In this way it might be possible under certain circumstances further to shorten not only the projecting portion 3*b* which serves as transmission member or perhaps even to eliminate it; instead, in this case, one might even provide a second parallel guidance of the load carrier 3 on the other side of the console 1. Solutions are also possible with three or more concentrically arranged parallel guidance means. The gain in relation to the guidance behavior of the load carrier movement in case of symmetrical arrangement of the parallel guidance means is, of course, counterbalanced by a greater expenditure and space requirement.

Various measures can be taken in order accurately to adjust the guides in a parallel manner. In the embodiment of FIG. 4, the superimposed freely suspended first connecting portions 11*c* of the guidance member are connected by means of an adjusting member 29 whose length can be changed. In the simplest case, this is a cropped wire which, by means of additional shaping of the cropping point, can subsequently be made longer or shorter.

The arrangement according to the invention constitutes a coupling oscillator connected between console 1 and load carrier 3. This leads to lesser dependence of the inherent resonances of the mechanical system on the weighing load and thus to a concentration of the inherent resonances in a lower range, compared to a simple oscillator (for example, about 9–11 cps instead of about 10–30 cps).

While in accordance with the provisions of the Patent Statutes the preferred forms and embodiments of the invention have been illustrated and described, various changes and modifications may be made without deviating from the inventive concepts set forth above.

What is claimed is:

1. In a weighing apparatus of the short-travel type including a console member (1), a load carrier member (3), a pair of parallel resilient guide means (11, 11') connecting said load carrier member for vertical displacement relative to said console member, and load indicating means for indicating the magnitude of a load applied to said load carrier means; the improvement wherein (a) said load carrier member is arranged immediately adjacent said console member;

(b) and further wherein each of said resilient guide means includes (1) two pairs of horizontal parallel spaced longitudinally extending arms a first pair of which (11*a*) is connected at one end with said console, the corresponding ends of the second pair of arms (11*b*) being connected with said load carrier; and (2) freely suspended first connecting means (11*c*) connecting together the other ends of said arms.

2. Apparatus as defined in claim 1, wherein each arm of said first pair of arms (11*a*) is integrally connected by said connecting means with a corresponding arm of said second pair of arms (11*b*), respectively.

3. Apparatus as defined in claim 1, and further including second connecting means (11*d*) connecting together said corresponding ends of said second pair of arms; and further wherein each of said guidance means comprises a unitary guidance member (11, 11') integral portions of which define said pairs of arms and said first and second connecting means, respectively.

4. Apparatus as defined in claim 3, and further including (c) a stationary frame (21); and (d) low-pass mechanical filter means connecting said console member for vertical movement relative to said frame, said filter means including a third pair of arms (11*e*) extending parallel with and spaced from said first and second pairs of arms, and means (11*f*) connecting said third arms at one end with said console member, the other ends of said third pair of arms being connected with said frame.

5. Apparatus as defined in claim 1, and further including means (19) defining adjacent each end of each of said guide arms a locally concentrated line of bending.

6. Apparatus as defined in claim 1, and further including adjustable-length means (29) connecting together the first connecting portions (11*c*) of said pair of guidance members.

7. Apparatus as defined in claim 1, wherein said load indicating means includes a vertically arranged vibratory measuring string (4) connected between said console member and said load carrier member.

8. Apparatus as defined in claim 7, wherein said console member includes a through opening (10); and further wherein said load carrier member includes an extension portion (3*b*) that extends horizontally through said console member opening, said measuring string being connected at its lower end with said extension portion and at its upper end with said console member.

9. Apparatus as defined in claim 8, and further including permanent magnet means (8, 9) mounted on said load carrier and operable to define a magnetic field in which the string is mounted.

* * * * *